United States Patent [19]
Di Gioia et al.

[11] Patent Number: 5,476,235
[45] Date of Patent: Dec. 19, 1995

[54] SPOOL HAVING SEGMENT CONSTRUCTION

[75] Inventors: Zefferino Di Gioia, Bockenheim; Hans Schmitt, Altleiningen-Höningen, both of Germany

[73] Assignee: Drahtwarenfabrik Drahtzug Stein GmbH & Co. KG, Drahtzug-Altleiningen, Germany

[21] Appl. No.: 189,413

[22] Filed: Jan. 31, 1994

[30] Foreign Application Priority Data

Feb. 27, 1993 [DE] Germany ............................ 9302874 U

[51] Int. Cl.⁶ .................................................. B65H 75/20
[52] U.S. Cl. ...................... 242/604.1; 242/608.8
[58] Field of Search ................... 242/604.1, 608.8, 242/118.7

[56] References Cited

U.S. PATENT DOCUMENTS

| | | | |
|---|---|---|---|
| 1,259,725 | 3/1918 | Dailey | 242/604.1 |
| 1,291,333 | 1/1919 | Wirt | 242/604.1 |
| 1,465,454 | 8/1923 | Newton | 242/604.1 |
| 1,932,059 | 10/1933 | White | 242/604.1 |
| 2,080,355 | 5/1937 | Geer | 242/604.1 |
| 2,973,915 | 3/1961 | Elow | 242/604.1 |
| 3,977,622 | 8/1976 | Fecher | 242/604.1 |
| 4,089,485 | 5/1978 | Van de Loock | 242/604.1 |
| 5,197,689 | 3/1993 | Barone | 242/118.7 |

*Primary Examiner*—Daniel P. Stodola
*Assistant Examiner*—William A. Rivera
*Attorney, Agent, or Firm*—Collard & Roe

[57] ABSTRACT

A spool for holding wires or cords made of metal, plastic or the like is useful, in particular, for holding welding wires. The spool is made from one-piece segments, each forming a U-shaped supporting bow with a cross bridge, and has legs extending inwardly from the ends of the cross bridge in radial planes. The free ends of the legs of the bow have extensions extending in the circumferential direction. The extensions, joined together, form two parallel wire rings and, for joining the segments together, each has an indentation at the transition end to the associated leg. The radial legs approximately extend up to the spool hub diameter and are bent through 180° outwardly in the direction of the extension and returned radially, whereby the outer side of the bend is tangential to the spool hub inner diameter. The cross bridges form the spool winding outer diameter.

4 Claims, 4 Drawing Sheets

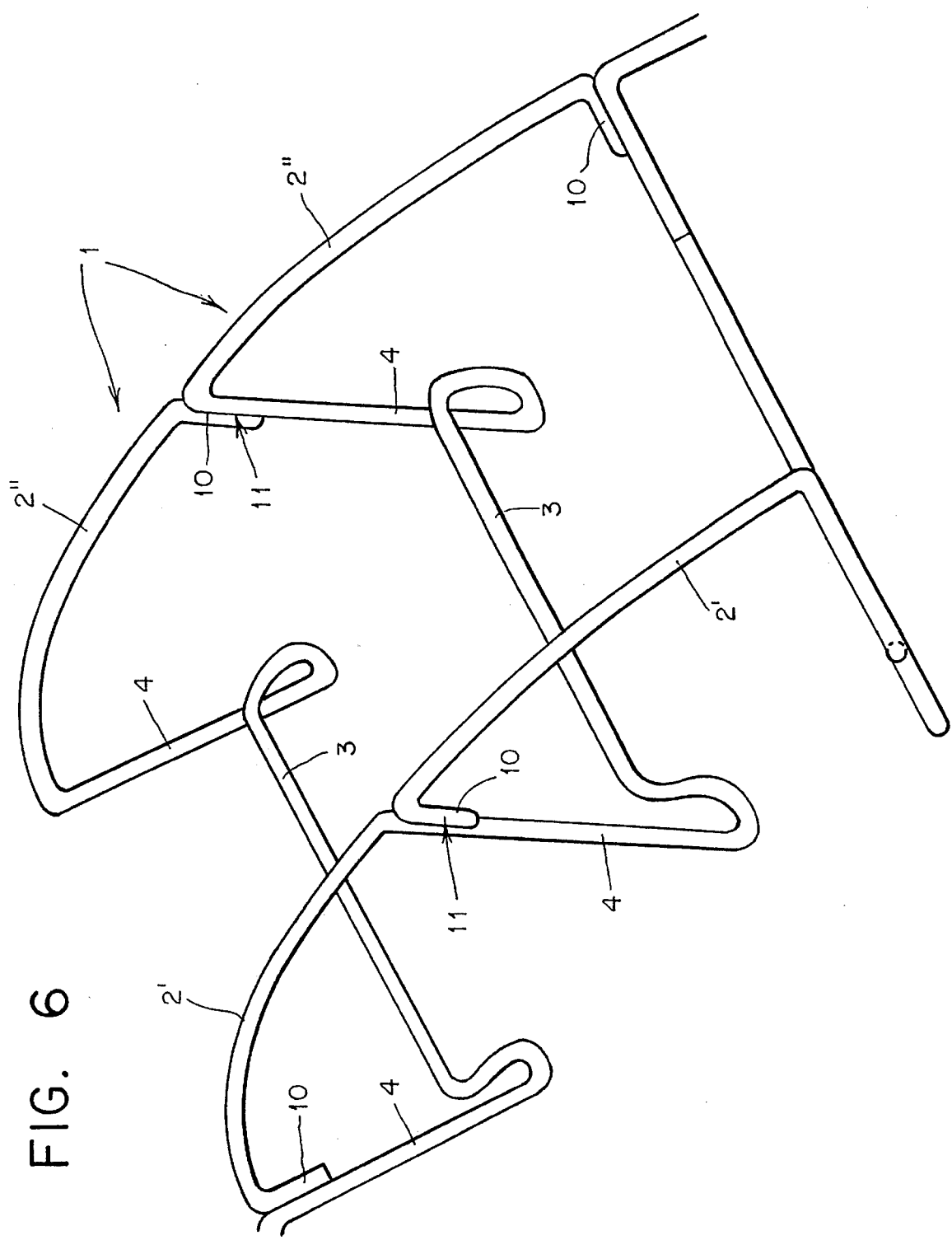

SPOOL HAVING SEGMENT CONSTRUCTION

BACKGROUND OF THE INVENTION

1. Field of the Invention

The present invention relates to a spool around which wires or cords made of metal, plastic or the like, and, in particular, welding wires, may be wrapped. The spool includes one-piece segments, each forming a U-shaped wire bow having a cross bridge and legs, extending inwardly in radial planes. The free ends of the legs of the wire bow have extensions extending in the circumferential direction. These extensions, when joined together, form two parallel wire rings and, for joining the segments together, each have an indentation on the transition end of the associated U-leg.

2. The Prior Art

DE 25 03 567 C2 discloses a spool which is produced by joining segments together in a very simple and low-cost manner with a low number of welds. In regard to this spool, the cross bridges between the legs of the U-shaped wire bow form the support for the wires to be wound, i.e., the core of the coil is formed with it. With certain size dimensions for the spools, in particular, when the diameter ratio between the core of the coil and the central spool hub diameter reaches a certain order of magnitude, adapters are used which permit mounting the spool on a matching running axle.

Furthermore, DE 28 14 057 A1 discloses a spool which is assembled from individual one-piece segments, whereby both the diameter of the core of the coil and a central diameter of the spool hub are formed by these segments. However, the disadvantage of this known spool is that the segments forming the spool require four welds for joining two of such segments. Thus, the placement of the welds is made more difficult by their specific position and, therefore, a more costly welding device is required. Moreover, the design of the segments causes an increased material consumption.

SUMMARY OF THE INVENTION

It is an object of the present invention to provide a spool which is produced without additional welding joints and with the application of the same manufacturing technique that produces both a winding diameter and a central spool hub diameter.

The above object is achieved according to the present invention by having the spool legs radially extend approximately up to the spool hub diameter and are bent radially inwardly or are bent outwardly radially, whereby the outer side of the bend produces the spool hub inner diameter, whereas the cross bridges form the spool winding outer diameter.

The present invention is directed to a spool for wire or cord made of metal, plastic or the like. The spool comprises one-piece segments, each forming a U-shaped wire bow having a cross bridge and a leg extending inwardly in a radial plane. Each leg has a free end having an extension extending in the circumferential direction, and several extensions, joined together, form two parallel wire rings. For joining the segments, each has an indentation at a transition end of the extension adjacent to the associated U-leg, and each leg radially extends approximately up to a spool hub inner diameter. In addition, each leg is bent inwardly or outwardly in the direction of the extensions to produce a bend and returned radially, the bend having an outer side which produces the spool hub inner diameter. The cross bridges form the spool winding outer diameter.

In one embodiment, the legs forming the short attachments enclose an angle of about 90° to about −15° relative to the long legs.

In another embodiment, the ends of the extensions are bend around radially inwardly; the ends extend parallel with the legs of the segment following each case; and these ends are rigidly connected with the legs, for example, by welds.

Furthermore, it is advantageous that the extensions extend in opposite directions.

The present invention has the advantage that through a non-obvious modification of a known spool, it is possible to produce a novel spool that has a central spool hub, without requiring any additional welds for the additional spool hub, and the novel spool can be manufactured in a low-cost, very efficient, manner.

BRIEF DESCRIPTION OF THE DRAWINGS other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views:

FIG. 6 shows a perspective view of a third embodiment for a segment of the spool according to the present invention.

DETAILED DESCRIPTION OF PREFERRED EMBODIMENTS

Figure 1:
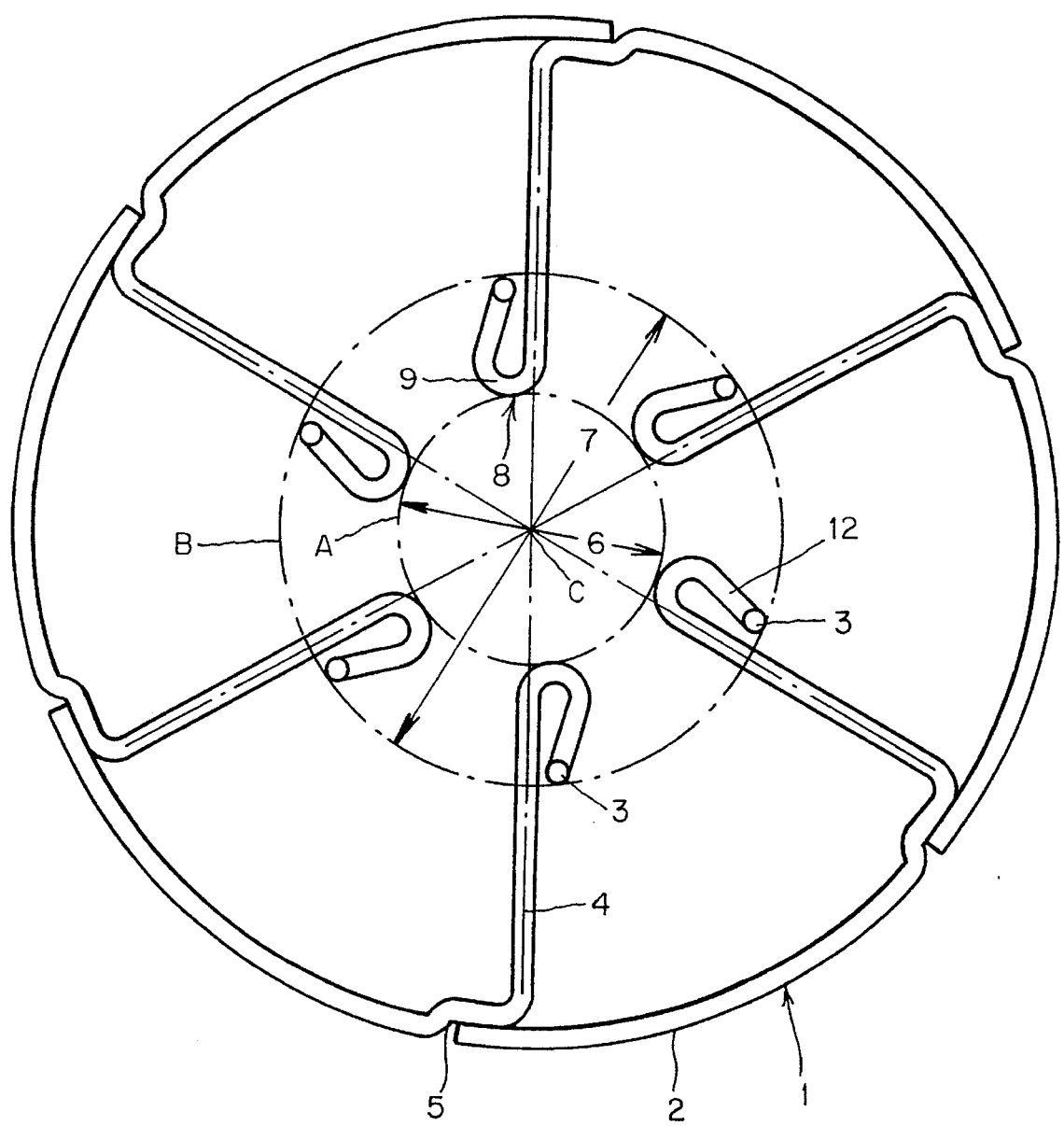
FIG. 1 shows a front view of the spool according to the invention.

Turning now in detail to the drawings, FIG. 1 shows a segment 1 that can be shaped in one manufacturing step in such a way that the curved, parallel extensions 2 of a U-shaped wire bow are changed into the two U-legs via an inwardly pressed indentation 5. The radial legs 4 approximately extend to the spool hub diameter 6, and are bent inwardly and then turned outwardly in the direction of the extensions 2. The outer side 8 of the bend 9 is tangential to the circle containing the spool hub inner diameter 6. Following the bend 9, the legs 4 are then turned further so as to form the short attachments 12 which are connected with the help of the cross bridges 3. The cross bridges 3 in combination form the spool winding outer diameter 7 as shown in FIGS. 1 and 2.

Figure 3:
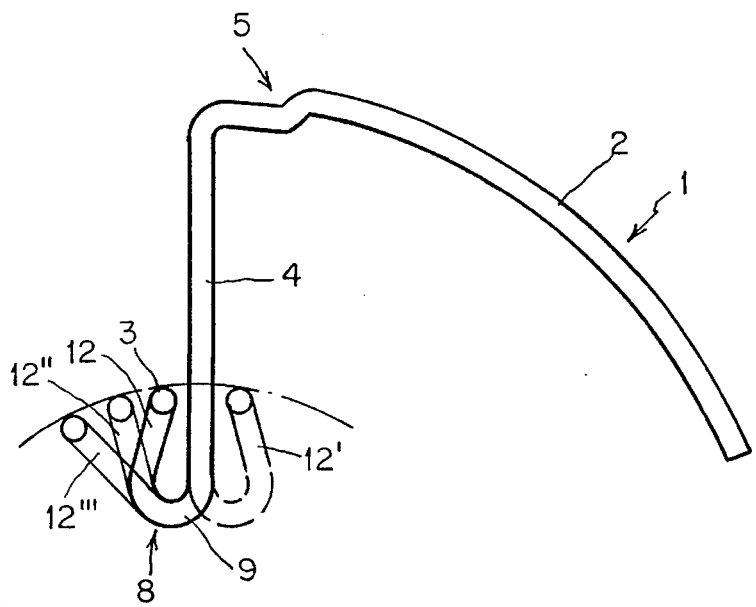
FIG. 3 shows a front view of a segment of the spool of FIG. 1.
Figure 4:
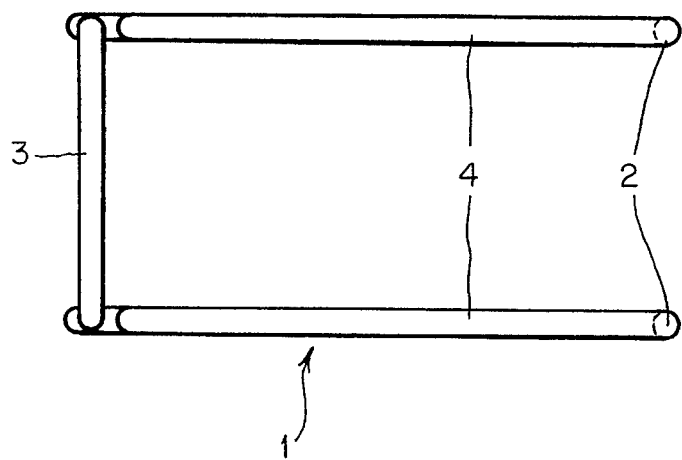
FIG. 4 shows a side view of the spool of FIG. 3.

FIG. 3 shows various embodiments for manufacturing the short attachments 12. The reference numeral 12 denotes the first embodiment that is bent outwardly through approximately 200°. The second embodiment has the attachments 12' bent inwardly. Additional embodiments are shown in FIG. 3 for the short attachments 12" and 12'". It can be seen that there is an angular relationship which ranges between about 90° to about −15° between the radially extending legs 4 and the position of the short attachments. Short attachments 12, 12', 12" and 12'" may extend in a straight line. Also, they can be bent circularly, ovally or in a polygonal manner. It is preferable that the cross bridges 3 are positioned as close as possible to the legs 4, as indicated for attachments 12, 12', in order to assure trouble-free removal and unwinding of the welding wire, as shown in FIG. 4.

Figure 2:
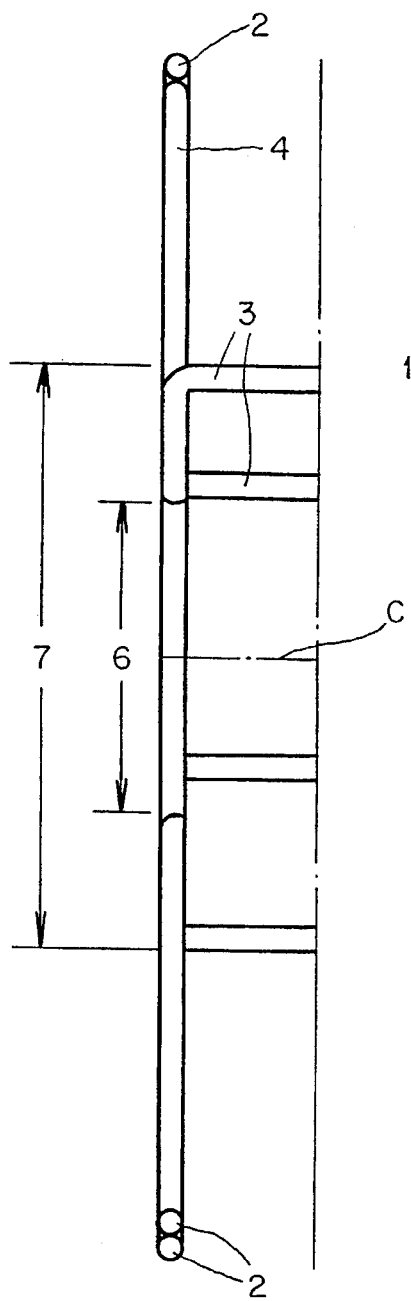
FIG. 2 shows a side view of the spool of FIG. 1.

When two or more of these segments 1 are joined together, in each case with the appropriate length of the curved and parallel extensions 2, a spool is obtained as shown in FIGS. 1 and 2. When the extensions 2 are positioned in a circle, the spool contains two parallel wire rings (i.e., inner ring A and outer ring B), and inwardly reaching wire bows equally spaced from the center axis C.

Figure 5:
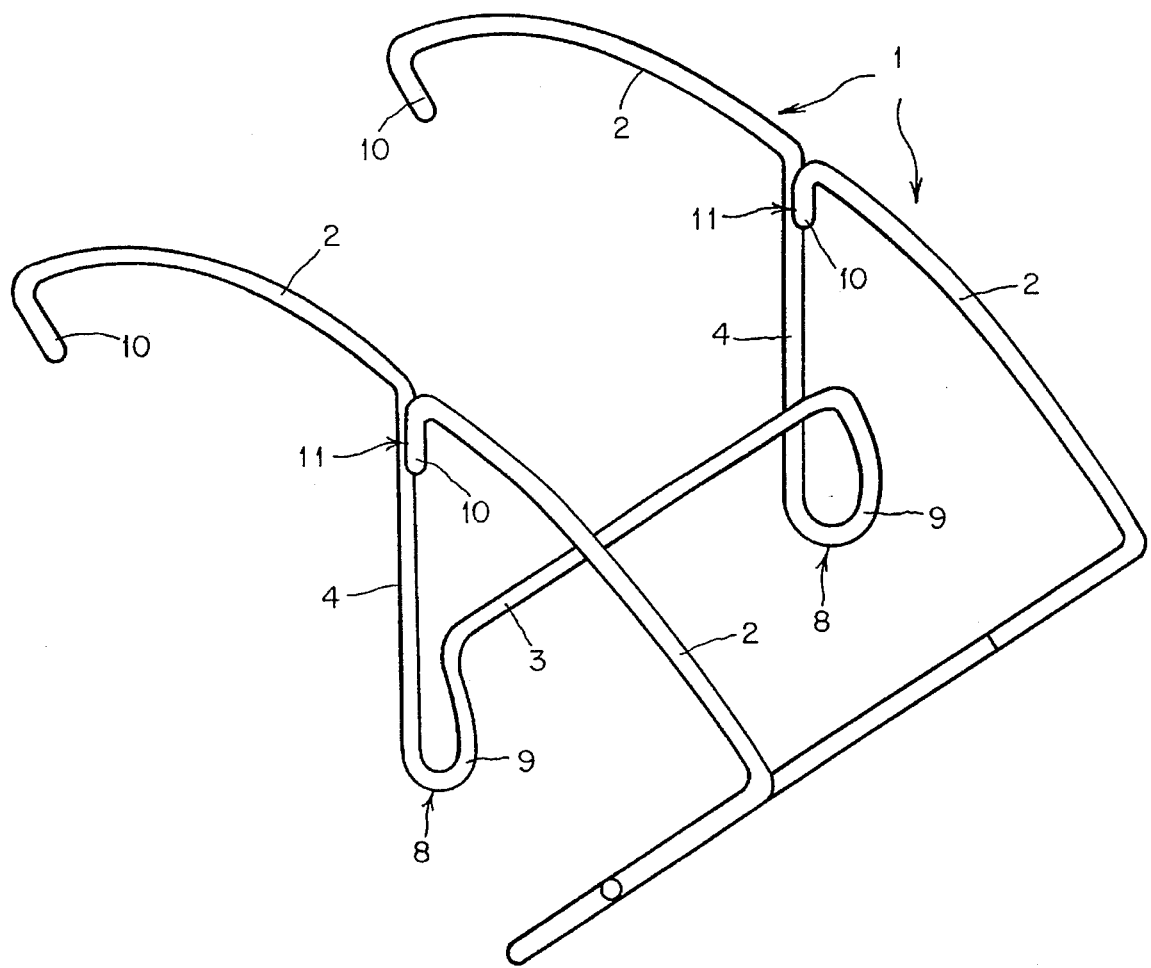
FIG. 5 shows a perspective view of a second embodiment of a segment of the spool according to the present invention.

A further embodiment is shown in FIG. 5. Here, the ends 10 of the extensions 2 of one segment are radially bent inwardly and extend parallel to the legs 4 of the adjacent segment following subsequently thereto. A connection is then established between the ends 10 and the legs 4 by means of welds 11.

Another embodiment is shown in FIG. 6. Here, the segments 1 have extensions 2' and 2" extending on the opposite sides of cross bridge 3 in an alternating manner. The connection between the individual segments 1 is made in accordance with welds 11 as in the embodiment of FIG. 5.

While several embodiments of the present invention have been shown and described, it is to be understood that many changes and modifications may be made thereunto without departing from the spirit and scope of the invention as defined in the appended claims.

What is claimed is:

1. Spool for wire or cord, said spool having a center axis and having a spool hub inner diameter, said spool comprising one-piece segments, each forming a U-shaped wire bow having a cross bridge and a pair of legs each defining a leg portion extending from the cross bridge inwardly in a radial plane toward said center axis;

each leg having a free end with an extension extending therefrom in a circumferential direction, in a manner whereby several extensions, joined together, form two spaced parallel wire rings;

each extension having an indentation at a transition end of the extension adjacent to the associated leg thereof to facilitate joining of the one-piece segments; and each leg being bent adjacent the spool hub inner diameter in the direction of the extensions to produce a bend to redirect the leg substantially radially, the bend having an outer side which defines the spool hub inner diameter and a spool winding outer diameter being defined by the cross bridges.

2. Spool according to claim 1, wherein each leg portion connecting the bend to the cross bridge defining a short attachment portion; and wherein the short attachment portion defines an angle which ranges between about 90° to about −15° relative to said leg.

3. Spool for wire or cord, said spool having a center axis and having a spool hub inner diameter, said spool comprising one-piece segments, each forming a U-shaped wire bow having a cross bridge and a pair of legs each defining a leg portion extending from the cross bridge inwardly in a radial plane toward said center axis;

each leg having a free end with an extension extending therefrom in a circumferential direction, in a manner whereby several extensions, joined together, form two spaced parallel wire rings;

each leg being bent adjacent the spool hub inner diameter in the direction of the extensions to produce a bend to redirect the leg substantially radially, the bend having an outer side which defines the spool hub inner diameter and a spool winding outer diameter being defined by the cross bridges;

wherein each extension has an end; and the end of the extension is bent radially inwardly, each end extending parallel to the radially inwardly extending leg of the adjacent following segment, and said end being rigidly connected to said leg.

4. Spool for wire or cord, said spool having a center axis and having a spool hub inner diameter, said spool comprising one-piece segments, each forming a U-shaped wire bow having a cross bridge and a pair of legs each defining a leg portion extending from the cross bridge inwardly in a radial plane toward said center axis;

each leg having a free end with an extension extending therefrom in a circumferential direction, in a manner whereby several extensions, joined together, form two spaced parallel wire rings;

each leg being bent adjacent the spool hub inner diameter in the direction of the extensions to produce a bend to redirect the leg substantially radially, the bend having an outer side which defines the spool hub inner diameter and a spool winding outer diameter being defined by the cross bridges;

wherein the extensions extend in the opposite circumferential directions from the cross bridge in an alternating manner.

\* \* \* \* \*